United States Patent [19]
Burr et al.

[11] 3,934,946
[45] Jan. 27, 1976

[54] RECIRCULATING BALL SLIDE

[75] Inventors: John Kelsey Burr, Shrewsbury; William Wolf, Eatontown, both of N.J.

[73] Assignee: Motion Systems, Inc., Shrewsbury, N.J.

[22] Filed: Oct. 5, 1973

[21] Appl. No.: 404,018

[52] U.S. Cl. .................................. 308/6 C; 308/191
[51] Int. Cl.² ........................................ F16C 17/00
[58] Field of Search .................... 308/6 C, 190, 191

[56] References Cited
UNITED STATES PATENTS

| 1,044,055 | 11/1912 | Johnson et al. | 85/9 R |
| 2,889,181 | 6/1959 | Lang et al. | 308/6 C |
| 2,890,594 | 6/1959 | Galonska | 308/6 C X |
| 2,945,366 | 7/1960 | Sears | 308/6 C X |
| 2,998,286 | 8/1961 | Jaruno | 308/6 C |
| 3,008,368 | 11/1961 | Hammitt et al. | 85/50 R X |
| 3,370,899 | 2/1968 | Eklund | 308/191 |
| 3,751,121 | 8/1973 | Geffner | 308/6 C |

FOREIGN PATENTS OR APPLICATIONS

| 2,831 | 1/1919 | Netherlands | 85/9 R |

Primary Examiner—Wendell E. Burns
Assistant Examiner—William C. Anderson

[57] ABSTRACT

A recirculating ball slide for supporting heavy loads. The slide includes an oval ball race having a special concave ball track. The balls are retained in the race by means of a housing having a cut-away lower portion to expose the balls for mating engagement with a slide rail which also has a concave ball track.

1 Claim, 6 Drawing Figures

RECIRCULATING BALL SLIDE

BACKGROUND OF THE INVENTION

1. Field of the Invention

This invention relates generally to ball slides. More particularly it relates to a recirculating ball slide capable of supporting heavy loads.

2. Discussion of the Prior Art

As is well known, ball slides are a useful alternative to other forms of moveable bearings, such as rotating ball-bearing wheels and the like.

See for example U.S. Pat. No. 3,557,721 which issued on Jan. 26, 1971 to Hans Worm. See also U.S. Pat. Nos. 3,398,999 and 2,681,836 which disclose similar structures.

Unfortunately, such prior art ball slides are not capable of good performance under heavy load due to binding of the ball bearings in the ball race. As a solution to the above and other problems, we have made this invention which comprises, in combination, a ball slide and a slide rail. The ball slide itself comprises a recirculating ball race, and a plurality of ball bearings. The ball bearings are retained within the race by retaining means and both the ball slide and the slide rail have a concave ball track formed therein. At least the ball track of the slide has an average radius of curvature less than 10 percent larger than the radius of the ball bearings, the center of curvature thereof being radially offset from the center of the ball bearings.

The invention and its mode of operation will be more fully understood from the following detailed description and the drawings in which:

DETAILED DESCRIPTION OF THE INVENTION

Figure 1:
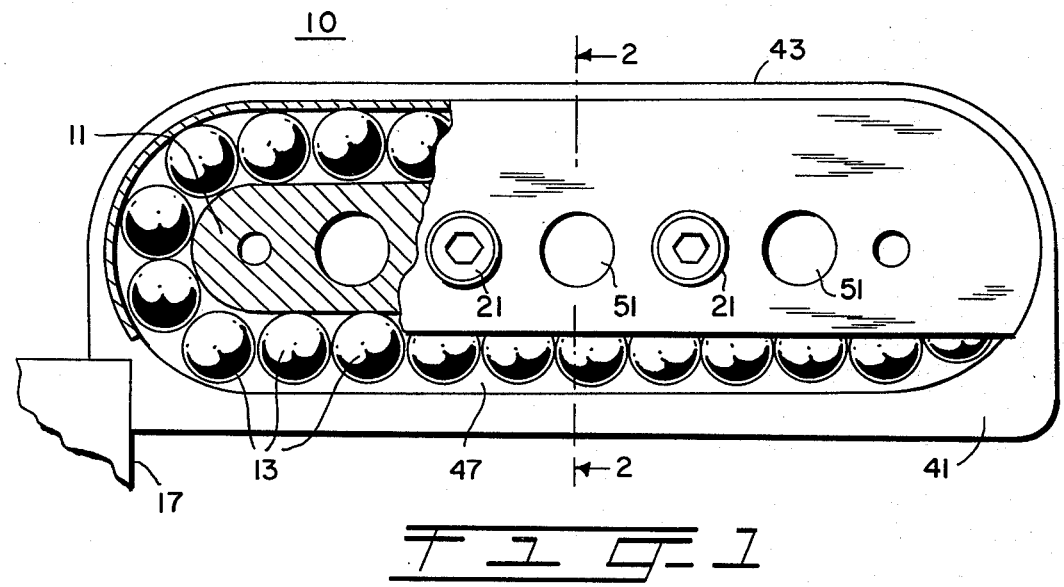
FIG. 1 is a partially cut-away front view of an illustrative embodiment of the invention.

Referring to FIG. 1, the ball slide 10 according to the invention comprises an oval race 11 which forms a special concave ball track 12 around which a plurality of ball bearings 13 are free to circulate.

Figures 2, 3:
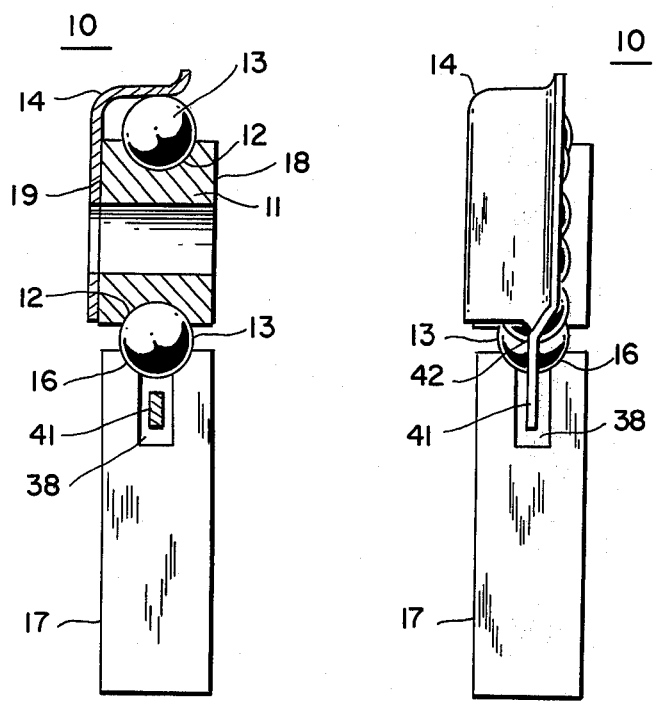
FIG. 2 is a cross-sectional view of the illustrative ball slide shown in FIG. 1 taken about section line 2—2.
FIG. 3 is an end view of the ball slide shown in FIG. 1.
Figure 5:
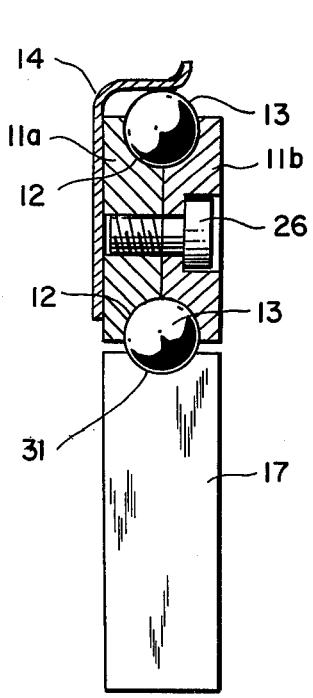
FIG. 5 is another cross-sectional view of the ball slide depicting an alternative mode of construction.

As may best be seen in FIG. 2, the ball slide 10 includes a housing 14 which encloses and protects the ball race 11 and ball bearings 13. The housing 14 holds the balls 13 firmly in the race but is cut-away at its lower edge to expose the balls for engagement with the mating surface 16 of a slide rail 17. Alternatively, the ball-bearings may be retained within the race by forming the race to extend beyond the center line of the ball bearings, as shown in FIG. 5.

The race 11 has a 180° bend at both ends and, as shown in FIG. 2, two parallel faces. The face 18 which is furthest from the housing 14 may advantageously be used to mount the assembly while the other face 19 is used to retain the housing, for example, by means of screws 21.

Figure 4:
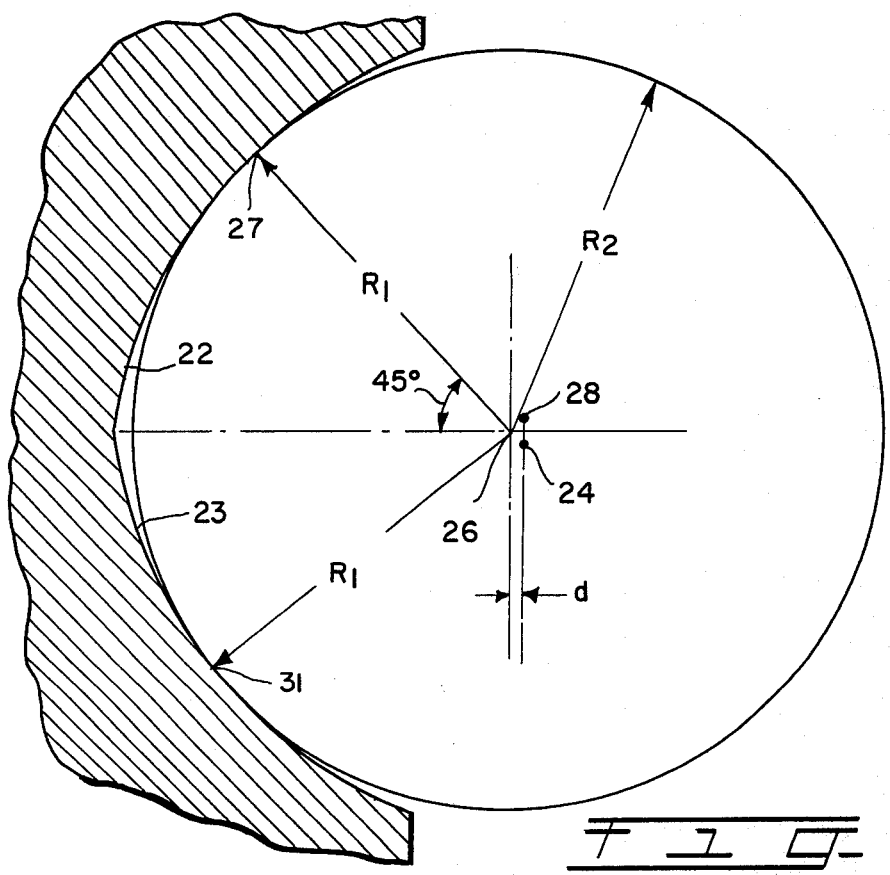
FIG. 4 depicts the relationship between a ball bearing and the ball track in the ball slide of FIG. 1.

Referring now to FIG. 4, the special concave ball track is seen to comprise two segments 22, 23 each having a radius of curvature $R_1$ approximately 5 percent larger than the theoretical radius $R_2$ of the ball bearings. The center of curvature of surface 22 is at 24, radially apart from the center 26 of the ball bearing by the distance $d$. Thus, the point of contact 27 between the ball and the ball race segment 22 makes an angle of approximately 45° to the normal. In like manner, the center of curvature 28 of surface 23 is radially apart from the center 26 of the ball bearing so that the point of contact 31 between the ball bearing and the ball race segment 23 is also at 45° to the normal. This unique configuration provides superior loading and minimizes free play between the balls and the race.

Advantageously, the ball bearings 13 comprise chrome steel, heat-treated to a hardness of Rockwell 60–66C. The ball race 11 and slide 17 are comprised of steel, heat-treated to a minimum of Rockwell 56C. Of course, in applications where severe environmental conditions exist the balls, ball race, etc. may be fabricated from Teflon, Nylon, etc. However, with such materials load capacity is greatly reduced. Other non-corrosive materials, such as stainless steel, Monel, Inconel, etc. may also be employed.

As discussed above, the ball bearings 13 may be retained within the race 11 by forming the race so that it extends over the center line of the balls. This may be most clearly seen from FIG. 5. For ease in manufacture the race 11 is formed from a left and a right hand position 11a, 11b, respectively, fastened together by a plurality of machine screws 26. An alternative manufacturing technique is to form the race from a single piece of metal and coin the edges of the race to obtain the same result.

The slide rail 17 is generally rectangular in shape and has a concave ball track 31 formed in at least one edge thereof. Advantageously, ball track 31 is identical with the ball track 12 in ball race 11. In the event that ball bearings 13 are retained in the race 11 by forming the housing 14 so that it extends over the center line of the balls, the housing is arranged to have a downwardly extending portion 41 offset at 42 so that it is centered over the ball bearings 13. In that case the slide rail 17 is manufactured with a slot or recess 38 formed therein to receive the downwardly extending portion 41 of the housing 14.

Housing 14 is most easily made by drawing or forming. A lip 43 formed at the upper edge provides rigidity, and this lip may be trimmed to provide either an open side or the above-mentioned downwardly extending portion 41. A window 47 must be opened in downwardly extending portion 41, e.g., by milling or punching to expose the balls.

The ball slide may be fastened to a flat surface by means of machine screws, etc. inserted through apertures 51 extending through the ball race 11. The slide rail 17 may be fastened in a similar manner.

Figure 6:
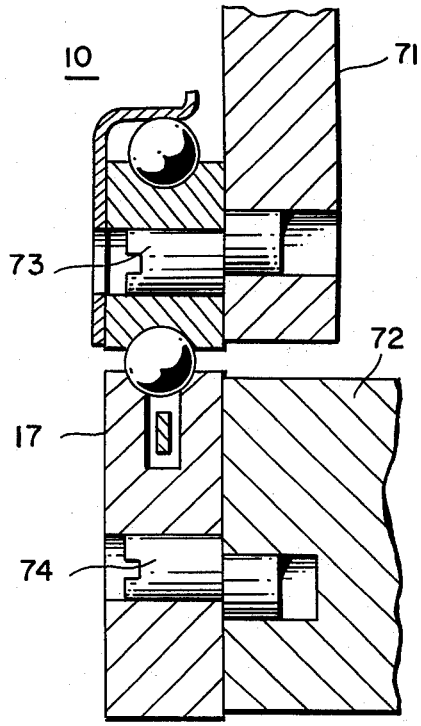
FIG. 6 is a cross-sectional view depicting the use of eccentric mounting screws for the embodiment of the invention shown in FIGS. 1–5.

FIG. 6 depicts a typical mounting situation. Here, however, the ball slide 10 is secured to the member 71 by an eccentric machine screw 73. In like manner, the slide rail 17 is secured to a member 72 by an eccentric machine screw 74. By rotating screw 73 and/or screw 74, the separation between the slide rail and the ball slide may be adjusted. Put another way, both the slide rail and the ball slide may be independently made straight by adjusting the several screws 73 and 74 used to mount them to the members 71 and 72.

This is particularly important if the length of the slide and/or the rail exceeds a foot or so.

One skilled in the art can make various changes to the arrangement of parts shown without departing from the spirit and scope of the invention.

What is claimed is:
1. In combination, a ball slide and a slide rail, said ball slide comprising:
   a recirculating ball race;
   a plurality of ball bearings; and
   means for retaining said ball bearings within said ball race, said ball slide and slide rail both including a concave ball track, at least the ball track in said ball race having an average radius of curvature less than 10 percent larger than the radius of said ball bearings, the center of curvature thereof being radially offset from the center of said ball bearings, said ball slide and said slide rail being respectively secured to first and second members which are adapted for relative movement with respect to one another, said slide rail and/or said ball slide being secured to their respective members by means of rotatable, eccentric machine screws.

* * * * *